(12) United States Patent
Zhu et al.

(10) Patent No.: US 12,608,553 B2
(45) Date of Patent: Apr. 21, 2026

(54) SYSTEM FOR SEMANTIC ANALYSIS AND AUTOMATIC SOLUTION OF MATHEMATICAL APPLICATION PROBLEM

(71) Applicant: BEI JING BDA NETWORK & INFORMATION CO., LTD, Beijing (CN)

(72) Inventors: Ping Zhu, Beijing (CN); Pohua Lv, Beijing (CN); Xuetao Jiang, Beijing (CN)

(73) Assignee: BEI JING BDA NETWORK & INFORMATION CO., LTD, Beijing (CN)

( * ) Notice: Subject to any disclaimer, the term of this patent is extended or adjusted under 35 U.S.C. 154(b) by 136 days.

(21) Appl. No.: 18/638,592

(22) Filed: Apr. 17, 2024

(65) Prior Publication Data

US 2025/0156643 A1 May 15, 2025

(30) Foreign Application Priority Data

Nov. 10, 2023 (CN) .......................... 202311498153.9

(51) Int. Cl.
*G06F 40/30* (2020.01)
*G06F 40/242* (2020.01)
*G06F 40/247* (2020.01)

(52) U.S. Cl.
CPC ............ *G06F 40/30* (2020.01); *G06F 40/242* (2020.01); *G06F 40/247* (2020.01)

(58) Field of Classification Search
CPC ....... G06F 40/242; G06F 40/247; G06F 40/30
See application file for complete search history.

(56) References Cited

U.S. PATENT DOCUMENTS

2016/0350277 A1* 12/2016 Malle .................... G06F 40/211
2021/0192142 A1* 6/2021 Feng ..................... G06F 16/483

OTHER PUBLICATIONS

H. Meng, T. Yang and X. Yu, "A Bi-Channel Math Word Problem Solver With Understanding and Reasoning,", 2021, 2021 IEEE International Conference on Engineering, Technology & Education (TALE), Wuhan, Hubei Province, China, pp. 29-34, (Year: 2021).*

(Continued)

*Primary Examiner* — Eric Yen
(74) *Attorney, Agent, or Firm* — Nixon Peabody LLP

(57) ABSTRACT

The present disclosure provides a system for semantic analysis and automatic solution of a mathematical application problem. The system includes: a semantic framework mode matching module, configured to: perform mode matching on a clause vocabulary sequence with a semantic framework, to form local semantic information of the mathematical application problem; a scenario semantic analysis module, configured to: form, based on a local feature vocabulary string of a scenario, a global semantic feature vocabulary string of the scenario; a data meta-variable naming module, configured to: generate a global semantic name of a data meta-variable based on a local name of a variable; a module for explicitly expressing a computation relationship, configured to: explicitly express an explicit computation rule and an implicit computation rule between data meta-variables, to construct a dynamic semantic circle; and a module for implementing a machine thinking mechanism, configured to solve the questionable data meta-variable.

4 Claims, 6 Drawing Sheets

(56)            References Cited

OTHER PUBLICATIONS

Xin Lin, Zhenya Huang, Hongke Zhao, Enhong Chen, Qi Liu, Defu Lian, "Learning Relation-Enhanced Hierarchical Solver for Math Word Problems,", 2024, in IEEE Transactions on Neural Networks and Learning Systems, vol. 35, No. 10, pp. 13830-13844 (Year: 2024).*

P. Zhu, P. Lv, J. Shi, X. Jiang, W. Zou and Y. Ma, "Semantic Inheritance and Overloading", 2022, 2022 IEEE 2nd International Conference on Software Engineering and Artificial Intelligence (SEAI), Xiamen, China, pp. 01-09 (Year: 2022).*

First Office Action for CN Patent Application No. 202311498153.9, by The State Intellectual Property Office of People's Republic of China, dated Apr. 25, 2024, 8 pages [English Translation Provided].

* cited by examiner

Global semantic
identifier $G\_Identifier_i$
string of last scenario, $$1 \le i \le n;$$

| 1 | 2 | ... | i | ... | n-1 | n |
|---|---|-----|---|-----|-----|---|

Local semantic identifier
$L\_Identifier_j$ string of
current scenario, $$1 \le j \le m;$$

| 1 | ... | j | ... | m |
|---|-----|---|-----|---|

FIG. 2

Global semantic identifier
$G\_Identifier_i$ string of last
scenario, $$1 \le i \le n;$$

Local semantic identifier
$L\_Identifier_j$ string of
current scenario, $$1 \le j \le m;$$

Global semantic identifier of
current scenario:

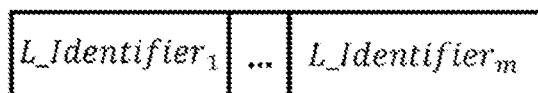

| $G\_Identifier_1$ | ... | $G\_Identifier_{i-1}$ |  +  | $L\_Identifier_1$ | ... | $L\_Identifier_m$ |
|---|---|---|---|---|---|---|

FIG. 3

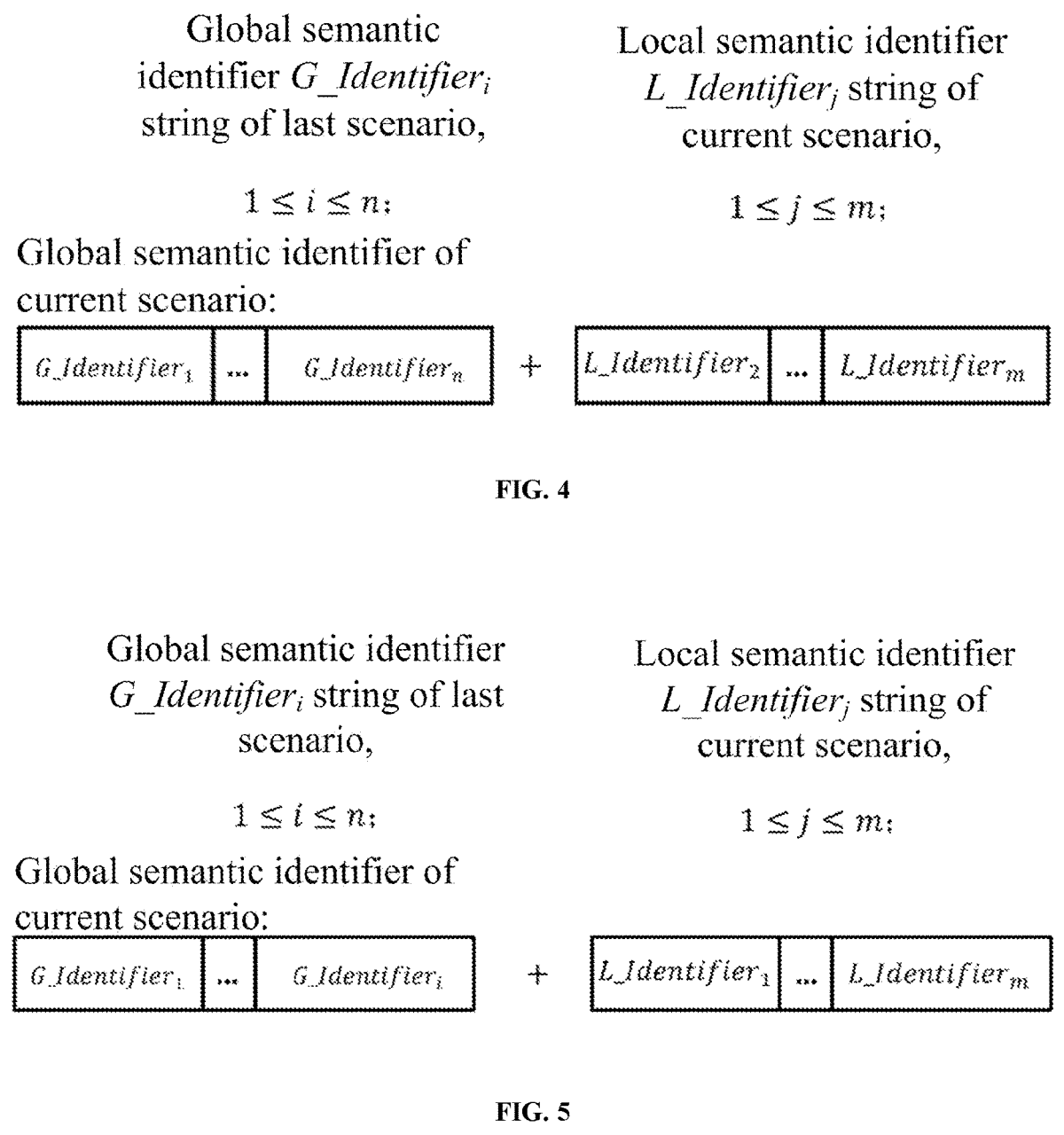

Global semantic
identifier $G\_Identifier_i$
string of last scenario, $1 \leq i \leq n$;

Local semantic identifier
$L\_Identifier_j$ string of
current scenario, $1 \leq j \leq m$;

Global semantic identifier of
current scenario:

| $G\_Identifier_1$ | ... | $G\_Identifier_n$ |
|---|---|---|

$+$

| $L\_Identifier_2$ | ... | $L\_Identifier_m$ |
|---|---|---|

FIG. 4

Global semantic identifier
$G\_Identifier_i$ string of last
scenario, $1 \leq i \leq n$;

Local semantic identifier
$L\_Identifier_j$ string of
current scenario, $1 \leq j \leq m$;

Global semantic identifier of
current scenario:

| $G\_Identifier_1$ | ... | $G\_Identifier_i$ |
|---|---|---|

$+$

| $L\_Identifier_1$ | ... | $L\_Identifier_m$ |
|---|---|---|

FIG. 5

Global semantic identifier $G\_Identifier_i$ string of last scenario, $$1 \leq i \leq n;$$

Local semantic identifier $L\_Identifier_j$ string of current scenario, $$1 \leq j \leq m;$$

Global semantic identifier of current scenario:

| $G\_Identifier_1$ | ... | $G\_Identifier_n$ | + | $L\_Identifier_2$ | ... | $L\_Identifier_m$ |

FIG. 6

Global semantic identifier $G\_Identifier_i$ string of last scenario, $$1 \leq i \leq n;$$

| 1 | 2 | ... | i | ... | n-1 | n |

Local semantic identifier $L\_Identifier_j$ string of current scenario, $$1 \leq j \leq m;$$

| 1 | ... | j | ... | m |

FIG. 7

Semantic identifier *Identifier$_i$* string of current scenario, $$1 \leq i \leq n;$$

Local name of variable: feature *LocalName$_j$* string, $$1 \leq j \leq m;$$

Global name of variable:

Semantic identifier *Identifier$_i$* string of current scenario, $$1 \leq i \leq n;$$

Local name of variable: feature *LocalName$_j$* string, $$1 \leq j \leq m;$$

Global name of variable:

Semantic identifier *Identifier$_i$* string of current scenario, $$1 \leq i \leq n;$$

Local name of variable: feature *LocalName$_j$* string, $$1 \leq j \leq m;$$

Global name of variable:

| *Identifier$_1$* | ... | *Identifier$_i$* | + | *LocalName$_1$* | ... | *LocalName$_m$* |

FIG. 10

Semantic identifier *Identifier$_i$* string of current scenario, $$1 \leq i \leq n;$$

Local name of variable: feature *LocalName$_j$* string, $$1 \leq j \leq m;$$

Global name of variable :

| *Identifier$_1$* | ... | *Identifier$_n$* | + | *LocalName$_1$* | ... | *LocalName$_m$* |

FIG. 11

SYSTEM FOR SEMANTIC ANALYSIS AND AUTOMATIC SOLUTION OF MATHEMATICAL APPLICATION PROBLEM

CROSS REFERENCE TO RELATED APPLICATION

This patent application claims the benefit of and priority to Chinese Patent Application No. 202311498153.9, filed with the Chinese Patent Office on Nov. 10, 2023, which is hereby incorporated by reference herein in its entirety.

TECHNICAL FIELD

The present disclosure relates to the field of semantic analysis, and in particular to a system for semantic analysis and automatic solution of a mathematical application problem.

BACKGROUND

Chat generative pre-trained transformer (ChatGPT) is an autoregressive model technology, and a technical product that is similar to a big model. A technical principle of ChatGPT is to predict a next token (a token herein may be a word, an image block, or a speech fragment) based on the foregoing description or the following description. Although ChatGPT has made relatively big breakthroughs in the field of artificial intelligence in recent years, ChatGPT still has problems that are difficult to resolve, including factual errors, logical errors, inconsistencies, limited reasoning, and ease of generating harmful content. Importantly, such models and technologies do not understand the common sense knowledge of the world.

During automatic human-like solving for a mathematical application problem, there are problems such as semantic conflicts, semantic echoes, and denotational disambiguation. As a result, understanding of scenario semantics is biased, and global semantics is difficult to formally express and apply.

SUMMARY

An objective of the present disclosure is to provide a system for semantic analysis and automatic solution of a mathematical application problem, to resolve problems that semantics is difficult to formally express and apply.

To achieve the above objective, the present disclosure provides the following technical solutions.

A system for semantic analysis and automatic solution of a mathematical application problem includes:

a semantic framework mode matching module, configured to: generate a clause vocabulary sequence of a mathematical application problem based on an input text, perform mode matching on the clause vocabulary sequence with a semantic framework, to form local semantic information of the mathematical application problem, where the local semantic information represents local semantics between clause vocabularies; and a semantic framework matched with the clause vocabulary sequence expresses the local semantics;

a scenario semantic analysis module, configured to: form a local feature vocabulary string of each scenario based on a feature vocabulary that represents scenario semantics and that is in a labeled clause vocabulary sequence, and form a global semantic feature vocabulary string of each scenario through semantic inheritance and semantic overloading of the local feature vocabulary string of each scenario, where the scenario semantics includes global semantics and local semantics;

a data meta-variable naming module, configured to: perform global semantic naming on a data meta-variable of a clause based on the local feature vocabulary string of each scenario through a synonym and a technology of inheritance and overloading of global semantics between clauses;

a module for explicitly expressing a computation relationship, configured to: explicitly express an explicit computation rule and an implicit computation rule between data meta-variables, to construct a dynamic semantic circle, where the data meta-variable includes an explicit known-value data meta-variable, a questionable data meta-variable, and an implicit intermediate data meta-variable; and the dynamic semantic circle includes an explicitly-expressed computation rule, an implicitly-expressed computation rule, and a solution formula; and a module for implementing a machine thinking mechanism, configured to solve the questionable data meta-variable based on the explicit known-value data meta-variable, the implicit intermediate data meta-variable, and the dynamic semantic circle of the computation rule.

Optionally, the system further includes a general knowledge base, where the general knowledge base includes a dictionary for a thinking machine, a library of semantic frameworks, a library of synonyms and near-synonyms, a knowledge map of subordinate relationships of concepts, a library of classifications of attribute relationships of concepts, a library of commonly used formulas, a library of computation rules of formulas, and a library of semantically constrained relationships.

Optionally, the system further includes a semantic labeling module, where the semantic labeling module is configured to: perform, based on word segmentation and part of speech tagging, semantic labeling on a clause vocabulary sequence that is not successfully matched with the semantic framework, and add a semantic framework of the clause vocabulary sequence that is not successfully matched with the semantic framework to a library of semantic frameworks in a general knowledge base.

Optionally, the semantic labeling module specifically includes:

a semantic dimension determining unit, configured to: perform, based on word segmentation and part of speech tagging, semantic labeling on the backbone statement that is not successfully matched with the semantic framework, and determine a to-be-labeled semantic dimension for the mathematical application problem, where the to-be-labeled semantic dimension includes a subordinate relationship of concepts, a conditional computation relationship, a computation relationship, an inequality relationship, an attribute relationship of concepts, a constant, and a variable that are implied in a text;

a definition unit, configured to: based on the to-be-labeled semantic dimension, define a semantic labeling grammar, and determine various labels, system-reserved keywords, and system-reserved global variable names; and an updating unit, configured to label the semantic framework of the backbone statement through the semantic labeling grammar, and store a semantic framework of the clause that passes through correctness validation into the library of semantic frameworks.

Optionally, the scenario semantic analysis module specifically includes a scenario division and labeling submodule, where the scenario division and labeling submodule includes:

a sorting unit, configured to: check input clause vocabulary sequences in sequence, and sort scenario semantic identifiers of each clause from large to small based on a category;

an analysis unit for a first clause scenario, configured to: if a first clause does not have an explicit scenario semantic identifier that belongs to a subordinate vocabulary of a knowledge map of subordinate relationships of concepts and does not have any relative participle of a text for problems, based on a scenario semantic identifier sequence, supplement the first clause with a default initial scenario semantic identifier, start a new scenario, and continuously analyze a next clause, where the any relationship includes a parallel relationship or a subordinate relationship;

a first analysis unit for a current clause scenario, configured to: if a locally explicated semantic identifier string of the current clause scenario is NULL, or if a local semantic identifier is the same as a global semantic identifier of a last clause scenario, assume that the current clause scenario continues the last clause scenario, and continuously analyze a next clause;

a second analysis unit for a current clause scenario, configured to: if a locally explicated semantic identifier string of the current clause scenario includes a subordinate vocabulary of a knowledge map of subordinate relationships of concepts, start a new scenario, and continuously analyze a next clause;

a third analysis unit for a current clause scenario, configured to: if a global semantic identifier of a last clause scenario includes a subordinate vocabulary of a knowledge map of subordinate relationships of concepts, continue a last scenario, and continuously analyze a next clause;

a fourth analysis unit for a current clause scenario, configured to: if a current clause includes a data meta-variable whose local name is the same as a local name of a data meta-variable of a last clause, and a global semantic identifier of a data meta-variable of the current clause is the same as a global semantic identifier of the data meta-variable of the last clause, supplement a default scenario semantic identifier, and assume that the current clause starts a new scenario, and continuously analyze a next clause;

a fifth analysis unit for a current clause scenario, configured to: if a global semantic identifier of the current clause scenario is different from a global semantic identifier of a last clause scenario, assume that a current clause starts a new scenario, and continuously analyze a next clause; and a sixth analysis unit for a current clause scenario, configured to: continue the last clause scenario, and continuously analyze a next clause.

Optionally, the scenario semantic analysis module specifically includes a submodule for inheritance and overloading of a scenario semantic identifier.

The submodule for inheritance and overloading of a scenario semantic identifier includes:

a global semantic analysis unit for a first clause scenario, configured to: taking a local semantic identifier of the first clause scenario as a global semantic identifier of the first clause scenario, and continuously analyze a next clause;

a global semantic analysis unit for a current clause scenario, configured to: if the current clause scenario continues the last clause scenario, determine that global semantics of the current clause scenario is the same as global semantics of the last clause scenario, and continuously analyze a next clause; and a unit for reverse comparison between identifiers, configured to: perform, in sequence, reverse comparison between a first identifier of local semantics of a current scenario and a global semantic identifier string of the last scenario, constitute a global semantic identifier of the current scenario, and continuously analyze a next clause.

Optionally, the data meta-variable naming module specifically includes:

a first feature comparison unit, configured to: perform, in sequence, reverse comparison between a first feature of a local name of a variable of a data meta-variable of a backbone statement and a global semantic identifier of a current scenario based on the local semantic feature vocabulary string;

a first naming unit for a global name of a variable, configured to: if a first feature is the same as a global semantic identifier of any current scenario, remove a first feature in a local name of a variable, splice a global semantic identifier string of the current scenario with a local name feature string of the variable, constitute a global name of the variable, and continuously analyze a next clause;

a second naming unit for a global name of a variable, configured to: if a first feature and a global semantic identifier of any current scenario are in a parallel relationship in a knowledge map of subordinate relationships of concepts, remove the global semantic identifier of the current scenario and a global semantic identifier after the global semantic identifier of the current scenario, splice a global semantic identifier string of the current scenario with a local name feature string of a variable, constitute a global name of the variable, and continuously analyze a next clause;

a third naming unit of a global name of a variable, configured to: if a first feature and a global semantic identifier of any current scenario are in a membership in a knowledge map of subordinate relationships of concepts, remove a global semantic identifier after the global semantic identifier of the current scenario, splice a global semantic identifier string of the current scenario with a local name feature string of a variable, constitute a global name of the variable, and continuously analyze a next clause;

a fourth naming unit of a global name of a variable, configured to: if a first feature and a global semantic identifier of a first current scenario are in a membership in a knowledge map of subordinate relationships of concepts through comparison, determine a local name feature string of a variable as a global name of the variable, and continuously analyze a next clause; and a fifth naming unit of a global name of a variable, if a first feature and a global semantic identifier of a first current scenario are not in a same relationship, a parallel relationship, or a membership through comparison, splice a global semantic identifier string of the scenario with a local name feature string of a variable, constitute a global name of the variable, and continuously analyze a next clause.

Optionally, the module for explicitly expressing a computation relationship specifically includes:

a mathematical object recognition unit, configured to: recognize a mathematical object implied in scenario semantics in a semantic framework sequence of the problem clause, where the mathematical object includes a set, a proportion, an interval, a number axis, and coordinates;

a dynamic semantic circle output unit, configured to: output dynamic semantic circles of a computation relationship of data meta-variables and a conditional computation relationship that are default by a mathematical object implied in context of problems;

a first input unit, configured to: input, into the dynamic semantic circle, a computation relationship of data meta-variables that is explicitly expressed by local semantics of a semantic framework sequence;

a second input unit, configured to: input, into the dynamic semantic circle, a computation relationship of data meta-variables that is explicitly expressed in a global semantic framework;

a third input unit, configured to: input, into the dynamic semantic circle, a mathematical general knowledge formula that is matched with the problem;

a fourth input unit, configured to: input, into the dynamic semantic circle, a common mathematical attribute formula that is matched with the problem; and a derivation unit, configured to: output a mathematical computation relationship that corresponds to an equivalent correlation relationship and that is matched with the problem, and supplement a computation relationship that is derived from a mathematical computation relationship in the dynamic semantic circle.

Optionally, the module for implementing a machine thinking mechanism specifically includes:

derive and compute, in the dynamic semantic circle, the intermediate data meta-variable and the questionable data meta-variable based on a known-value data meta-variable in a table of data meta-variables, determine whether solving for the problem is completed, and if solving for the questionable data meta-variable is completed, return successfully; and if solving for all questionable data meta-variables is not completed, set a next variable in the table of data meta-variables as x, derive and compute a quadratic equation in the dynamic semantic circle, solve for x, continue to derive the dynamic semantic circle, determine whether solving for the problem is completed, and if solving for the questionable data meta-variable is completed, return successfully;

if solving for all questionable data meta-variables is not completed, set any two variables in the table of data meta-variables as x and y, perform elimination based on a binary equation, and if elimination is successful, continue to solve for the questionable data meta-variable, or if solving for the questionable data meta-variable is not completed, return successfully; or if solving for all questionable data meta-variables is not completed and the problem satisfies a constraint condition for a variable feature, change the questionable data meta-variable into a known-value data meta-variable, and continue to solve for the questionable data meta-variable until the constraint condition for the variable feature is satisfied.

According to specific embodiments provided by the present disclosure, the present disclosure provides the following technical effect. In the present disclosure, the clause is taken as a semantic unit and research on automatic machine processing on Chinese semantics is performed by labeling the semantic framework with a natural language instance. In addition, the backbone vocabulary sequences of the clause constitute the semantic framework, to express the local semantics. The global semantic naming on the data meta-variable is implemented through synonyms and near-synonyms as well as a technology of inheritance and overloading of global semantics between clauses, to implement inheritance and overloading of semantics, and implement automatic human-like solving for the mathematical application problem.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

FIG. 2 is a schematic diagram of generation of a global semantic identifier of a current scenario;

FIG. 3 is a schematic diagram in which a semantic identifier of a current scenario is the same a first semantic identifier of the current scenario;

FIG. 4 is a schematic diagram in which a global semantic identifier of a last scenario and a first local semantic identifier of a current scenario are in a parallel relationship;

FIG. 5 is a schematic diagram in which a scenario semantic identifier and a local name feature 1 of a variable are in a membership;

FIG. 6 is a schematic diagram in which a first identifier of last global semantics and a first identifier of current local semantics are not in a same relationship, a parallel relationship, or a membership;

FIG. 7 is a schematic diagram of a combination method of a global name of a variable;

FIG. 10 is a schematic diagram in which a scenario semantic identifier and a first feature of a local name of a variable are in a membership; and FIG. 11 is a schematic diagram in which a scenario semantic identifier and a first feature of a local name of a variable are not in a same relationship, a parallel relationship, or a membership.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide a system for semantic analysis and automatic solution of a mathematical application problem, to implement semantic inheritance and semantic overloading.

In order to make the above objective, features, and advantages of the present disclosure clearer and more comprehensible, the present disclosure will be further described in detail below in combination with accompanying drawings and particular implementation modes.

Figure 1:
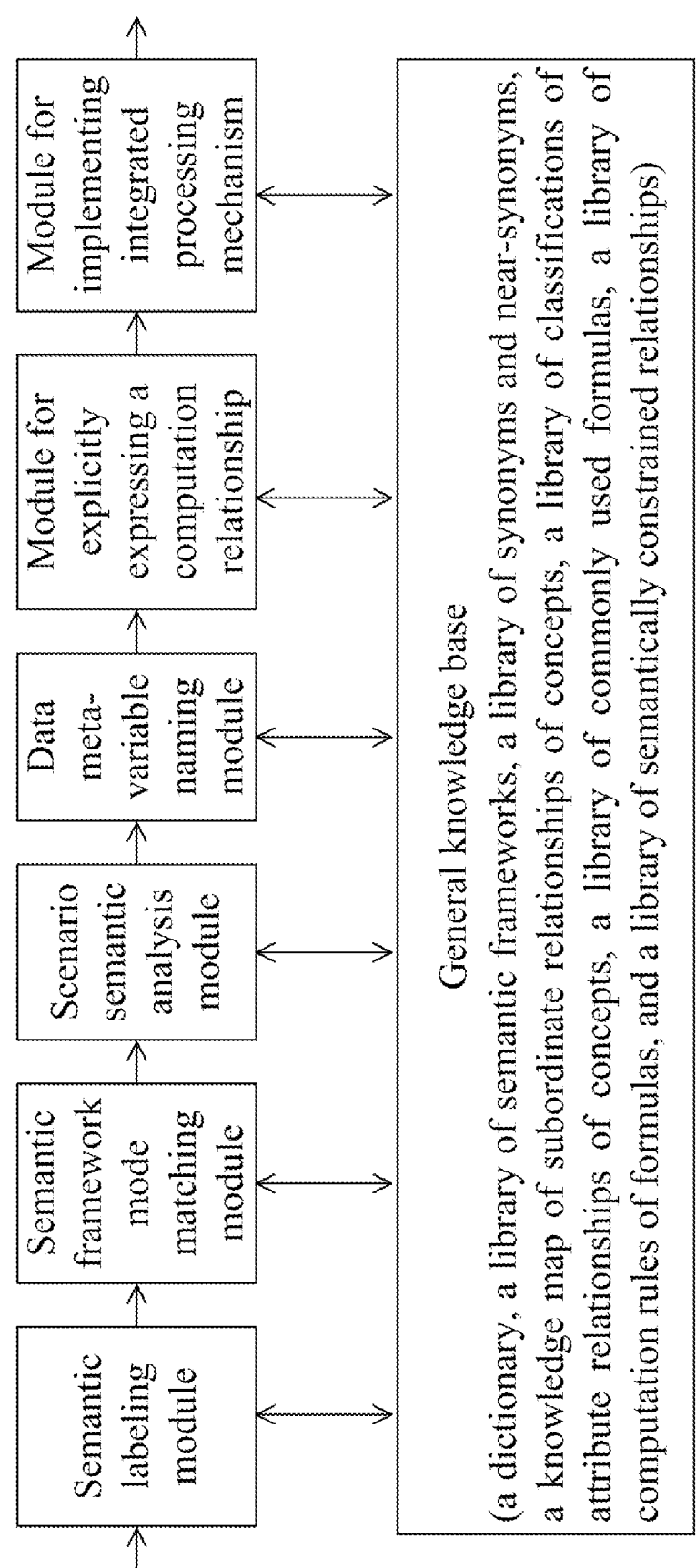
FIG. 1 is a diagram of a structure of a system for semantic analysis and automatic solution of a mathematical application problem provided in the present disclosure.

As shown in FIG. 1, the present disclosure provides a system for semantic analysis and automatic solution of a mathematical application problem to the field of semantic analysis. The system includes: a semantic framework mode matching module, a data meta-variable naming module, a module for explicitly expressing a computation relationship, a module for implementing a machine thinking mechanism, and a module for implementing a machine thinking mechanism.

The semantic framework mode matching module is configured to: generate a clause vocabulary sequence of a mathematical application problem based on an input text, perform mode matching on the clause vocabulary sequence with a semantic framework, to form local semantic information of the mathematical application problem, where the local semantic information represents local semantics between clause vocabularies; and a semantic framework matched with the clause vocabulary sequence expresses the local semantics.

In an optional implementation of the present disclosure, the semantic framework mode matching module performs mode matching with the semantic framework after word segmentation and part of speech tagging are performed on the input clause, and multidimensional scenario semantic information of the matched semantic framework is inherited and overloaded by a last semantic framework, to supplement cross-semantic framework information, and form complete semantics of context of the clause.

Due to semantic framework mode matching, the multidimensional semantic expression implied in the text is determined through a library of synonyms and near-synonyms, a library of equivalent expression structures, and a description grammar of a semantic framework. During automatic human-like solving for the mathematical application problem, semantic expression includes multidimensional semantics of a skeleton vocabulary, an ordinary formula, a logical constant, and a logical conditional formula.

The scenario semantic analysis module is configured to: form a local feature vocabulary string of each scenario based on a feature vocabulary that represents scenario semantics and that is in a labeled clause vocabulary sequence, and form a global semantic feature vocabulary string of each scenario through semantic inheritance and semantic overloading of the local feature vocabulary string of each scenario, where the scenario semantics includes global semantics and local semantics.

In an optional implementation of the present disclosure, the scenario semantic analysis module uses a vocabulary that may be inherited, overloaded, or ignored to construct, in the clause vocabulary sequence, a feature vocabulary string capable of identifying scenario semantics.

The data meta-variable naming module is configured to: perform global semantic naming on a data meta-variable of a clause based on the local feature vocabulary string of each scenario through a synonym and a technology of inheritance and overloading of global semantics between clauses.

In an optional implementation of the present disclosure, when performing naming on the data meta-variable, the data meta-variable naming module first determines a parallel relationship between clause identifiers. When all clause identifiers are in a parallel relationship, the data meta-variable naming module performs naming on the data meta-variable through a technology of semantic overloading. If context identifiers are in a subordinate relationship, an identifier vocabulary string of a semantic inheritance scenario is required, and local semantic vocabularies of a variable name are compared in sequence. If there is a vocabulary that needs to be overloaded (a parallel vocabulary that has a common superordinate concept in the knowledge map), the parallel vocabulary is replaced based on the overloading technology.

The module for explicitly expressing a computation relationship is configured to: explicitly represent an explicit computation rule and an implicit computation rule between data meta-variables, to construct a dynamic semantic circle, where the data meta-variable includes an explicit known-value data meta-variable, a questionable data meta-variable, and an implicit intermediate data meta-variable; and the dynamic semantic circle includes an explicitly-expressed computation rule, an implicitly-expressed computation rule, and a solving formula.

In an optional implementation of the present disclosure, the module for explicitly expressing a computation relationship expresses that the natural language semantics implies explicit and implicit computation relationships between data meta-variables. For example, in terms of a type of description of the data meta-variable, not only the explicit known-value data meta-variable and the questionable data meta-variable exist, but also the implicit intermediate data meta-variable exists. The computation rule has two expression types, namely, explicit expression and implicit expression, and is explicitly expressed in a standard form. Corresponding to a library of computation formulas and solution rules, a dynamic semantic circle of a computation rule for a problem is constituted, to perform reasoning and computation on a specific problem.

The module for implementing a machine thinking mechanism is configured to solve the questionable data meta-variable based on the explicit known-value data meta-variable, the implicit intermediate data meta-variable, and the dynamic semantic circle of the computation rule.

In an optional implementation of the present disclosure, the module for implementing a machine thinking mechanism 5 performs, through the explicitly expressed data meta-variable, the computation rule, and a corresponding solving formula, iterative derivation for solving, until the questionable data meta-variable is solved. In addition, equation solving may be performed. The questionable data meta-variable of a problem is set to x, and then iterative derivation is performed through the explicit computation rule and the corresponding solving formula, until all questionable data meta-variables are solved by equation solving. Values of data meta-variables that are cyclically enumerated may be constrained based on a mode in a library of semantically constrained relationships, until all values of to-be-solved questionable data meta-variables satisfy a constraint condition.

In practical application, the present disclosure further includes a general knowledge base and a semantic labeling module. The general knowledge base is used to construct, based on semantic labeling and re-formalized storage of existing corpus resources, background data, information, and knowledge that are necessary for computation and derivation.

The general knowledge base includes a dictionary for a thinking machine, a library of semantic frameworks, a library of synonyms and near-synonyms, a knowledge map of subordinate relationships of concepts, a library of classifications of attribute relationships of concepts, a library of commonly used formulas, a library of computation rules of formulas, and a library of semantically constrained relationships.

The semantic labeling module is configured to label a backbone semantic vocabulary (including a scenario feature vocabulary) sequence of the clause based on word segmentation and part of speech tagging, and store the backbone semantic vocabulary sequence into a library of semantic frameworks.

The semantic framework includes a clause vocabulary sequence labeled by a semantic grammar and implied semantics.

Working processes of the modules are as follows:

The semantic labeling module is configured to label a backbone semantic vocabulary (including a scenario feature vocabulary) sequence of the clause based on word segmentation and part of speech tagging, and store the backbone semantic vocabulary sequence into a library of semantic frameworks. The semantic framework includes a clause vocabulary sequence labeled by a semantic grammar and implied semantics. Examples of semantic labeling grammars are as follows:

<semantic labeling grammar>::-<expression framework><labeling triple of subordinate relationships of concepts><labeling semantic skeleton><labeling data element computation formula><labeling conditional expression><labeling conditional constant><labeling feature keyword variable> . . .

<expression framework>::-{<vocabulary sequence ID><feature identifier><vocabulary><vocabularies of synonyms and near-synonyms><defaultable identifier><replaceable identifier>|<vocabulary sequence ID><feature identifier><input vocabulary of functional operation>}

<labeling triple of subordinate relationships of concepts>::-{<vocabulary, subordinate relationship, vocabulary>}

<labeling semantic skeleton>::- {<operation><subject><object>|<subject><state> | . . . }

<labeling data element computation formula>::-{<computation formula ID><table of data meta-variables><table of formula variables>}

<labeling conditional expression>::{<conditional expression><computation formula ID><table of data meta-variables><table of formula variables>}

<labeling conditional constant>::-{<greater than><data meta-variable><data meta-variable>|<less than><data meta-variable><data meta-variable>|<equal to><data meta-variable><data meta-variable>|<known><data meta-variable>|<unknown><data meta-variable> . . . }

<labeling feature keyword variable>::- <n_accumulator><A_accumulator><##_accumulator> <counter><!!><##> . . . (where 0<=n<=counter, "A_" represents a last accumulator of a current counter, "!!"

represents an actual value string matched with "!!", and "##" represents that the counter minus an actual value matched with "!!")

Step 1.1: Determine a to-be-labeled semantic dimension for an application problem, for example, a subordinate relationship of concepts, a conditional computation relationship, a computation relationship, an inequality relationship, an attribute relationship of concepts, a constant, and a variable that are implied in a text.

Step 1.2: Define a semantic grammar, and determine various labels, system-reserved keywords, and system-reserved global variable names.

Step 1.3: Label a semantic framework through the semantic grammar, and store a semantic framework that passes through correctness validation into a library of semantic frameworks.

The general knowledge base constructs, based on semantic labeling and re-formalized storage of existing corpus resources, background data, information, and knowledge that are necessary for computation and derivation, such as a dictionary for a thinking machine, a library of semantic frameworks, a library of synonyms and near-synonyms, a knowledge map of subordinate relationships of concepts, a library of classifications of attribute relationships of concepts, a library of commonly used formulas, a library of computation rules of formulas, and a library of semantically constrained relationships.

Step 2.1: Determine an intelligent application and a demand range of general knowledge.

Step 2.2: Design a formal expression and a storage format for general knowledge.

Step 2.3: Develop interfaces for storing and accessing a general knowledge base.

Step 2.4: Complete addition of general data to the general knowledge base (for example, a dictionary, a table of synonyms and near-synonyms, a knowledge map of subordinate relationships of concepts, a library of commonly used formulas, and a library of computation rules).

Step 2.5: Perform system debugging based on a system prototype, gradually add specialized semantic data information used by a specific application, and store the specialized semantic data information into a specialized general knowledge base, for example, the library of semantic frameworks.

A semantic framework of the semantic framework mode matching module includes a backbone vocabulary sequence whose unit is clause. The semantic framework mode matching module performs mode matching with the semantic framework after word segmentation and part of speech tagging are performed on the input clause, and multidimensional scenario semantic information of the matched semantic framework is inherited and overloaded by a last semantic framework, to supplement cross-semantic framework information, and form complete semantics of context of the clause. Due to semantic framework mode matching, the multidimensional semantic expression implied in the text is determined through a library of synonyms and near-synonyms, a library of equivalent expression structures, and a description grammar for a semantic framework. During automatic human-like solving for the mathematical application problem, semantic expression includes multidimensional semantics of a skeleton vocabulary, an ordinary formula, a logical constant, and a logical conditional formula.

Step 3.1: Perform mode matching on a semantic framework antecedent (the backbone vocabulary sequence) with an input text unit.

Step 3.2: Record multidimensional local semantic information in a matched semantic framework posterior.

Step 3.3: Correct the multidimensional local semantic information based on a keyword replaced during mode matching.

The scenario semantic analysis module uses a vocabulary that may be inherited, overloaded, or ignored to construct, in the clause vocabulary sequence, a feature vocabulary string capable of identifying scenario semantics. During automatic human-like solving for the mathematical application problem, a name of the data meta-variable is formed by combining a semantic identifier string of a scenario in which the data meta-variable is located with local labeling information of the clause. For example, naming information of a local data meta-variable of the clause may be supplemented, through semantic inheritance and semantic overloading, with a labeled scenario identifier of the clause. When there is no explicit scenario identifier across the clause, a default semantic identifier of a special system is used to complete semantic inheritance or semantic overloading. Generally, in a conceptual hierarchical mathematical application problem, for data metal-variables of same nature, global semantics of the scenario is supplemented through a technology of semantic inheritance and semantic overloading, to implement operations of addition and subtraction; and for data meta-variables of different nature, description of the scenario is continued through a technology of semantic inheritance, to implement operations of multiplication and division in the scenario. For example, during process computation (for example, speed*time=distance), different nature of data meta-variables across clauses continue a same semantic scenario, to achieve multiplication and division operations. Through scenario semantic analysis, a vocabulary that may be semantically inherited and overloaded in consecutive scenarios based on information from a general knowledge map at a conceptual subordinate level. If a backbone vocabulary in a participle vocabulary sequence of the semantic framework belongs to a parallel relationship in a general knowledge map at a conceptual level, transformation of the scenario identifier through the technology of semantic overloading. For example, for a clause "20 sets are produced in the morning of the first day," and an adjacent clause "21 sets are produced in the afternoon," "the first day" is inherited, and "morning" is overloaded by "afternoon". In addition, nature features of the data meta-variable such as a number, a number of people, a quantity, time, a distance, a speed, efficiency, a density, or a concentration, are keywords that are retained by a system, and generally may not be used as a scenario identifier for inheritance and overloading. A process of semantic inheritance and semantic overloading is that a last semantic framework and a next semantic framework inherit and replace a feature vocabulary for describing the scenario. During automatic human-like solving for the mathematical application problem, the technology of semantic inheritance and overloading is used to supplement basic information of global semantics of the data meta-variable. In addition, the technology of semantic inheritance and overloading is one of basic links of resolving problems such as semantic conflicts, semantic echoes, and denotational disambiguation.

(1) Method for Scenario Division and Labeling

Step 4.1.1: Check input clause vocabulary sequences in sequence, and sort scenario semantic identifiers of each clause from large to small based on a category, that is, a conceptual category of an identifier with a serial number of 1 is the largest.

Step 4.1.2: If a first clause does not have an explicit scenario semantic identifier that belongs to a subordinate vocabulary of a knowledge map of subordinate relationships of concepts and does not have a parallel relative participle or a subordinate relative participle of a text for problems, a system supplements the first clause with a system-default initial scenario semantic identifier "sysfirstsys", starts a new scenario, and continuously analyzes a next clause.

Step 4.1.3: If a locally explicated semantic identifier string of the current clause scenario is NULL, or if a local semantic identifier is the same as a global semantic identifier of a last clause scenario, assume that the current clause continues the last clause, and continuously analyze a next clause.

Step 4.1.4: If a locally explicated semantic identifier string of the current clause scenario includes a subordinate vocabulary of a knowledge map of subordinate relationships of concepts, start a new scenario, and continuously analyze a next clause.

Step 4.1.5: If a global semantic identifier (refer to definition below) of a last clause scenario includes a subordinate vocabulary of a knowledge map of subordinate relationships of concepts, continue a last scenario, and continuously analyze a next clause.

Step 4.1.6: If a current clause includes a data meta-variable whose local name is the same as a local name of a data meta-variable of a last clause, and a global semantic identifier (context) of a data meta-variable of the current clause is the same as a global semantic identifier of the data meta-variable of the last clause, supplement a system-default scenario semantic identifier, and assume that the current clause starts a new scenario, and continuously analyze a next clause.

Step 4.1.7: If a global semantic identifier of the current clause scenario is different from a global semantic identifier of a last scenario, assume that a current clause starts a new scenario, and continuously analyze a next clause.

Step 4.1.8: Continue the last clause scenario, and continuously analyze a next clause.

(2) Technology of Inheritance and Overloading of Scenario Semantic Identifier

Scenario semantics includes global semantics and local semantics, and is expressed by a scenario semantic identifier string. Input clause vocabulary sequences and scenarios which the input clause vocabulary sequences belong to are checked in sequence. A global semantic identifier of the scenario is generated according to the following steps. Referring to FIG. 2, m represents a total number of local semantic identifiers; j represents a serial number of a local semantic identifier during current comparison; n represents a total number of global semantic identifiers; and i represents a serial number of a global semantic identifier during current comparison.

Step 4.2.1: Take a local semantic identifier of a first clause (scenario) as a global semantic identifier of the first clause, and continuously analyze a next clause.

Step 4.2.2: If the current clause continues the last clause scenario, determine that global semantics of the current clause scenario is the same as global semantics of the last clause scenario, and continuously analyze a next clause.

Step 4.2.3: Perform, in sequence, reverse comparison between a first identifier $L\_Identifier_1$ of local semantics of a current scenario and a global semantic identifier string (that is, start from $G\_Identifier_n$) of the last scenario, and constitute a global semantic identifier of the current scenario, where there are the following several cases:

(a) If $L\_Identifier_1$ is the same as $G\_Identifier_i$, remove $L\_Identifier_1$ in a local semantic identifier in the current scenario, splice a global semantic identifier string of the current scenario with a local semantic identifier string of the current scenario, to constitute a global semantic identifier (refer to FIG. 3) of the current scenario, and continue to analyze a next clause.

(b) If $L\_Identifier_1$ and $G\_Identifier_i$ are in a parallel relationship in the knowledge map of subordinate relationships of concepts, after the global semantic identifier $G\_Identifier_i$ of the last scenario and an identifier (that is, identifiers with labels of i to n) that is after the global semantic identifier of the last scenario are removed, splice a global semantic identifier string of the last scenario and with the local semantic identifier of the current scenario, to constitute a global semantic identifier (refer to FIG. 4) of the current scenario, and continue to analyze a next clause.

(c) If $G\_Identifier_i$ and $L\_Identifier_1$ are in a membership in the knowledge map of subordinate relationships of concepts, remove an identifier (that is, identifiers with labels of i+1 to n) that is after the global semantic identifier $G\_Identifier_i$ of the last scenario, splice the global semantic identifier string of the last scenario with the local semantic identifier of the current scenario, to constitute a global semantic identifier (refer to FIG. 5) of the current scenario, and continue to analyze a next clause.

(d) Continue to perform the foregoing step (a) to step (c), compare a next identifier of the last scenario, and if $L\_Identifier_1$ and $G\_Identifier_1$ are in membership in the knowledge map of subordinate relationships of concepts, the local semantic identifier of the current scenario constitutes the global semantic identifier of the last scenario, and a next clause is continuously analyzed.

(e) If $L\_Identifier_1$ and $G\_Identifier_1$ are not in a same relationship, a parallel relationship, or a membership, simply splice the global semantic identifier of the last scenario with the local semantic identifier of the current scenario, to constitute a global semantic identifier of the last scenario.

The data meta-variable naming module first determines a parallel relationship between clause identifiers. When all clause identifiers are in a parallel relationship, the data meta-variable naming module performs naming on the data meta-variable through a technology of semantic overloading. If context identifiers are in a subordinate relationship, an identifier vocabulary string of a semantic inheritance scenario is required, and local semantic vocabularies of a variable name are compared in sequence. If there is a vocabulary that needs to be overloaded (a parallel vocabulary that has a common superordinate concept in the knowledge map), the parallel vocabulary is replaced based on the overloading technology. Specifically, firstly, a replaceable vocabulary in a local semantic name of the data meta-variable labeled by the semantic framework is matched and replaced, to form a local semantic name of an actual data meta-variable corresponding to an input context environment. Secondly, forward splicing (the global semantic identifier string is located in front, and the local semantic name is in behind) is performed on the global semantic identifier string generated in step 4 and the local semantic name of the data meta-variable through a technology of semantic inheritance and semantic overloading, to form a scenario semantic name (a final result) of a data meta-variable of an actual problem for subsequent processes of semantic analysis and reasoning. Finally, forward splicing is performed on a local name of a data meta-variable of a wildcard scenario with a global semantic identifier string of another scenario of the problem through the technology of semantic inheritance and semantic overloading. If a formed global semantic name of the data meta-variable scenario does not exist, new data meta-variables corresponding to scenarios are generated.

A method for inheritance and overloading for global semantic naming of data meta-variable includes the following steps.

Figure 8:
FIG. 8 is a schematic diagram in which a scenario semantic identifier is the same as a first feature of a local name of a variable.

Step 5.1: Perform naming on a data meta-variable (refer to FIG. 7), and perform, in sequence, reverse comparison between a first identifier $LocalName_1$ of a local name of a variable and a (global) semantic identifier (that is, start from $Identifier_n$) of a current scenario, where there are the following several cases:

Step 5.2: If $LocalName_1$ are the same as $Identifier_i$, remove a feature $LocalName_1$ in the local name of the variable, simply splice a semantic identifier string of a current scenario with the local name (the feature string) of the variable, constitute a global name (refer to FIG. 8) of the variable, and continue to analyze a next clause.

Figure 9:
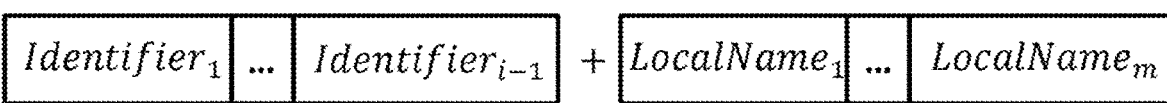
FIG. 9 is a schematic diagram in which a scenario semantic identifier and a first feature of a local name of a variable are in a parallel relationship.

Step 5.3: If $LocalName_1$ and Identifier; are in a parallel relationship in the knowledge map of subordinate relationships of concepts, remove a semantic identifier $Identifier_i$ of the current scenario and a subsequent identifier (that is, identifiers with labels of i to n), splice the semantic identifier string of the current scenario with the local name (the feature string) of the variable, constitute a global name (refer to FIG. 9) of the variable, and continue to analyze a next clause.

Step 5.4: If $Identifier_i$ and $LocalName_1$ are in a membership in the knowledge map of subordinate relationships of concepts, remove an identifier (that is, identifiers with labels of i+1 to n) after the semantic identifier $Identifier_i$ of the current scenario, splice the semantic identifier string of the current scenario with the local name (the feature string) of the variable, constitute a global name (refer to FIG. 10) of the variable, and continue to analyze a next clause.

Step 5.5: If $LocalName_1$ and $Identifier_1$ are in a membership in the knowledge map of subordinate relationships of concepts through comparison, determine a local feature string of the variable as a global name of the variable, and continue to analyze a next clause.

Step 5.6: If $LocalName_1$ and $Identifier_1$, $Identifier_1$ and $LocalName_1$ are not in a same relationship, a parallel relationship, or a membership (a subordinate relationship) through comparison, simply splice a scenario semantic identifier string with a local name feature string of the variable, constitute a global name of the variable (refer to FIG. 11), and continue to analyze a next clause.

The module for explicitly expressing a computation relationship expresses that the natural language semantics implies explicit and implicit computation relationships between data elements. For example, in terms of a type of description of the data meta-variable, not only the explicit known-value data meta-variable and the questionable data meta-variable exist, but also the implicit intermediate data meta-variable exists. The computation rule has two expression types, namely, explicit expression and implicit expression, and is explicitly expressed in a standard form. Corresponding to a library of computation formulas and solution rules, a dynamic semantic circle of a computation rule for a problem is constituted, to perform reasoning and computation on a specific problem. Main steps are as follows.

Step 6.1: Recognize a mathematical object (a set, a proportion, an interval, a number axis, and coordinates) implied in scenario semantics in a semantic framework sequence of the problem clause.

Step 6.2: Output dynamic semantic circles of a computation relationship of data meta-variables and a conditional computation relationship that are defaulted by a mathematical object implied in context of problems.

Step 6.3: Input, into the dynamic semantic circle, a computation relationship of data meta-variables that is explicitly expressed by local semantics of a semantic framework sequence.

Step 6.4: Input, into the dynamic semantic circle, a computation relationship of data meta-variables that is explicitly expressed by a global semantic framework (a backbone vocabulary sequence of an antecedent across a clause).

Step 6.5: Input, into the dynamic semantic circle, a mathematical general knowledge formula (for example, a surface area formula for a swimming pool) that is matched with a problem.

Step 6.6: Input, into the dynamic semantic circle, a common mathematical attribute formula (for example, quantity=buns~number~*quantity::buns~number~::efficiency) that is matched with the problem.

Step 6.7: Output a mathematical computation relationship (for example, ##A ##:: ##B ##::excess amount=##B ##:: ##A ##::deficient amount) that corresponds to an equivalent correlation relationship and matched with the problem.

Step 6.8: Supplement another computation relationship that is derived from a computation relationship in the dynamic semantic circle (for example, A=D may be derived from A=B+C and D=B+C).

A module for implementing a machine thinking mechanism that is applied to automatic human-like solving for the mathematical application problem includes: perform, through the explicitly expressed data meta-variable, the computation rule, and a corresponding solving formula, iterative derivation for solving, until the questionable data meta-variable is solved. In addition, equation solving may be performed. The questionable data meta-variable of a problem is set to x, and then iterative derivation is performed through the explicit computation rule and the corresponding solving formula, until all questionable data meta-variables are solved by equation solving. Values of data meta-variables that are cyclically enumerated may be constrained based on a mode in a library of semantically constrained relationships, until all values of to-be-solved questionable data meta-variables satisfy a constraint condition. Main implementation steps are as follows.

Step 7.1: Derive and compute, in the dynamic semantic circle, the intermediate data meta-variable and the questionable data meta-variable based on a known-value data meta-variable in a table of data meta-variables, determine whether solving for the problem is completed, and if solving for the questionable data meta-variable is completed, return successfully.

Step 7.2: If solving for all questionable data meta-variables is not completed, set a next variable in the table of data meta-variables as x, derive and compute a quadratic equation in the dynamic semantic circle, solve for x, according to step 7.1, continue to derive the dynamic semantic circle, determine whether solving for the problem is completed, and if solving for the questionable data meta-variable is completed, return successfully.

Step 7.3: If solving for all questionable data meta-variables is not completed, set any two variables in the table of data meta-variables as x and y, perform elimination based on a binary equation, and if elimination is successful, according to step 7.2, continue to solve for the questionable data meta-variable, or if solving for the questionable data meta-variable is not completed, return successfully; or Step 7.4: If solving for all questionable data meta-variables is not completed and the problem satisfies a constraint condition for a variable feature (for example, the feature is not greater than 50), perform enumeration on the variable from 0, 1, to 49 in sequence, change a variable into a known-value data meta-variable, continue to solve for the questionable data meta-variable according to step 7.1, until the constraint condition for the variable feature is satisfied.

In the present disclosure, the clause is taken as a semantic unit and research on automatic machine processing on Chinese semantics is performed by labeling the semantic framework with a natural language instance. In addition, the backbone vocabulary sequences of the clause constitute the semantic framework, to express the local semantics. The global semantic naming on the data meta-variable is implemented through synonyms and near-synonyms as well as a technology of inheritance and overloading of global semantics between clauses, to implement automatic human-like solving for the mathematical application problem. Except for some special wildcard expressions (for example, "everyone shoots an image" may be classified as a scenario describing a "people" or a scenario describing an "image"), natural language expressions are usually constituted with consecutive semantic scenarios, and there is inheritance and overloading between different semantic scenarios. On the contrary, if there is no inheritance and overloading between semantic scenarios, it indicates that two semantic scenarios are not related, or that two semantic scenarios express an unrelated theme.

For a software development method based on instance expansion and validation, semantic inheritance and semantic overloading correspond to reference and replacement of backbone vocabularies of adjacent semantic frameworks, and need to be supported by a general knowledge base and a technology of global semantic analysis, for example, general knowledge such as the knowledge map of subordinate relationships of concepts (which may contain three types of relationships, namely, a synonymy relationship, parallel relationship, and a membership) and global analysis capabilities such as enumeration, counting, accumulation, and set partitioning. The subordinate relationship of concepts expresses a hierarchical structure (an ontology-like relational structure) whose concepts are systematized, and is of great importance for semantic understanding of set numerical computation and logical reasoning (especially for an elementary mathematical application problem).

The method for semantic analysis and automatic solution of a mathematical application problem provided in the present disclosure is based on the premise that fluent expressions of contextual scenarios of natural language contexts are all connected and logically supported within the semantic category. If a clause is used as a unit of analysis and labeling, there is inheritance or overloading of semantic components of consecutive clauses.

At present, a product or method closest to the present disclosure in the world is an autoregressive model technology of ChatGPT, and a similar big model technology product. Compared with the foregoing technical method, the technical method provided in the present disclosure possesses characteristics of interpretability, credibility, security, and emergent superintelligence:

(1) Interpretability:

Thinking actions related to the present disclosure are all based on simple computation and logical derivation, and each thinking action may be recorded and traced back. This enables the technical method provided in the present disclosure to have strong logic and a strong reasoning capability in applications, and each step may be explained by simple logic and understood by people. This advantage is from "semantic labeling" and "scenario semantic analysis".

(2) Believable:

Compared with the ChatGPT technical solution, sources of all pieces of information in the present disclosure are from semantic content that is labeled manually and the general knowledge base, and all derivations are in line with scientific principles and general knowledge. This advantage is from construction of the general knowledge base.

(3) Security:

Compared with the ChatGPT technical solution, all data, information, and knowledge used in the technical method provided in the present disclosure are processed, calibrated, and examined by people, that is, are all confirmed based on human knowledge under monitoring, filtering, and management, and do not have harmful content, and are artificial intelligence applications that are safe and reliable. This advantage is from semantic labeling and construction of the general knowledge base.

(4) Superintelligence:

The technical method provided in the disclosure is based on understanding, computation, and derivation of human knowledge, and supplements deficiency of human brain thinking and memory with a powerful and precise computer capability. In comparison with the ChatGPT technical solution based on probability computation, a super thinking method exceeding a human intelligence level under the premise of big data is easier to generate and emerge. This advantage is from "scenario division and labeling method" and "a technology of inheritance and overloading of scenario semantic identifiers", and from overall application effect of the technical content of the present disclosure.

Each embodiment in the description is described in a progressive mode, each embodiment focuses on differences from other embodiments, and references can be made to each other for the same and similar parts between embodiments.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A system for semantic analysis and automatic solution of a mathematical application problem, comprising:
at least one processor; and
a memory storing instructions that, when executed by the at least one processor, cause the system to perform operations comprising:
generating a clause vocabulary sequence of the mathematical application problem based on an input text, and performing mode matching on the clause vocabulary sequence with a semantic framework, to form local semantic information of the mathematical application problem, wherein the local semantic information represents local semantics between clause vocabularies, and the semantic framework matched with the clause vocabulary sequence expresses the local semantics;
forming a local feature vocabulary string of each of multiple scenarios based on a feature vocabulary that represents scenario semantics in a labeled clause vocabulary sequence, and forming a global semantic feature vocabulary string of each of the multiple scenarios through semantic inheritance and semantic overloading of the local feature vocabulary string of each of the multiple scenarios, wherein the scenario semantics comprises global semantics and local semantics;
based on the local feature vocabulary string of each scenario, performing global semantic naming on data meta-variables of a clause through a technology of inheritance and overloading of global semantics between a synonym and the clause;
explicitly expressing an explicit computation rule and an implicit computation rule between the data meta-variables, to construct a dynamic semantic circle, wherein the data meta-variables comprise an explicit known-value data meta-variable, a questionable data meta-variable, and an implicit intermediate data meta-variable; and the dynamic semantic circle comprises an explicitly-expressed computation rule, an implicitly-expressed computation rule, and a solution formula; and
solving the questionable data meta-variable based on the explicit known-value data meta-variable, the implicit intermediate data meta-variable, and the dynamic semantic circle.

2. The system for semantic analysis and automatic solution of the mathematical application problem according to claim 1, further comprising a general knowledge base, wherein the general knowledge base comprises a dictionary for a thinking machine, a library of semantic frameworks, a library of synonyms and near-synonyms, a knowledge map of subordinate relationships of concepts, a library of classifications of attribute relationships of concepts, a library of commonly used formulas, a library of computation rules of formulas, and a library of semantically constrained relationships.

3. The system for semantic analysis and automatic solution of the mathematical application problem according to claim 1, wherein the operations further comprise:
performing, based on word segmentation and part of speech tagging, semantic labeling on a clause vocabulary sequence that is not successfully matched with the semantic framework, and adding a semantic framework of the clause vocabulary sequence that is not successfully matched with the semantic framework to a library of semantic frameworks in a general knowledge base.

4. The system for semantic analysis and automatic solution of the mathematical application problem according to claim 3, wherein performing, based on word segmentation and part of speech tagging, semantic labeling on the clause vocabulary sequence that is not successfully matched with the semantic framework, and adding a semantic framework of the clause vocabulary sequence that is not successfully matched with the semantic framework to the library of semantic frameworks in the general knowledge base comprises:
performing, based on word segmentation and part of speech tagging, semantic labeling on the clause vocabulary sequence that is not successfully matched with the semantic framework, and determining a to-be-labeled semantic dimension for the mathematical application problem, wherein the to-be-labeled semantic dimension comprises a subordinate relationship of concepts, a conditional computation relationship, a computation relationship, an inequality relationship, an attribute relationship of concepts, a constant, and a variable, which are implied in a text;

based on the to-be-labeled semantic dimension, defining a semantic labeling grammar, and determining various labels, system-reserved keywords, and system-reserved global variable names; and labeling a semantic framework of the clause through the semantic labeling grammar, and storing the semantic framework of the clause into the library of semantic frameworks after the semantic framework of the clause passes through correctness validation.

* * * * *